United States Patent [19]
Knost

[11] Patent Number: 5,875,705
[45] Date of Patent: Mar. 2, 1999

[54] BAKING OVEN

[75] Inventor: Dieter Knost, Osnabrück, Germany

[73] Assignee: Werner & Pfleiderer Lebensmitteltechnik GmbH, Dinkelsbuhl, Germany

[21] Appl. No.: 93,395

[22] Filed: Jun. 9, 1998

[30] Foreign Application Priority Data

Jun. 9, 1997 [DE] Germany .......................... 197 24 112.3
May 6, 1998 [DE] Germany .......................... 198 20 061.7

[51] Int. Cl.$^6$ ................. A21B 1/00; A21B 1/08; A23L 3/00; H05B 6/64
[52] U.S. Cl. .................. 99/443 C; 99/386; 99/477; 126/19 R; 126/21 A; 432/145; 432/152
[58] Field of Search .................. 99/386, 443 C, 99/443 R, 326–331, 473–477, 468; 34/72, 211–215; 126/21 A, 19 R, 299 D, 20, 20.1; 219/394, 396, 388, 478, 413, 697, 400, 700; 312/236; 432/145, 120, 128, 247, 152; 426/523, 509

[56] References Cited

U.S. PATENT DOCUMENTS

| | | | |
|---|---|---|---|
| 3,777,118 | 12/1973 | Creus | 219/394 |
| 3,830,624 | 8/1974 | Sperring et al. | 432/145 |
| 4,054,778 | 10/1977 | Wollich | 219/494 X |
| 4,246,462 | 1/1981 | Mesel | 99/443 C |
| 4,493,641 | 1/1985 | Hubbert | 432/145 X |
| 4,520,575 | 6/1985 | Holmes et al. | 34/216 X |
| 4,757,800 | 7/1988 | Shei et al. | |
| 4,764,108 | 8/1988 | Carthew et al. | 432/247 X |
| 4,884,552 | 12/1989 | Wells et al. | |
| 4,951,645 | 8/1990 | Luebke et al. | 126/19 R |
| 5,121,677 | 6/1992 | Le Claire et al. | 99/443 C |
| 5,254,839 | 10/1993 | Laine | 219/494 |
| 5,277,105 | 1/1994 | Bruno et al. | 99/386 X |
| 5,475,958 | 12/1995 | Josefsson | 99/477 X |
| 5,793,019 | 8/1998 | Boyle et al. | 219/400 |

FOREIGN PATENT DOCUMENTS

| | | |
|---|---|---|
| 853731 | 7/1949 | Germany . |
| 2629716 | 1/1977 | Germany . |
| 3152708 | 7/1988 | Germany . |
| 9419075 | 3/1995 | Germany . |
| 19546641 | 6/1997 | Germany . |

*Primary Examiner*—Timothy F. Simone
*Attorney, Agent, or Firm*—Browdy & Neimark

[57] ABSTRACT

A baking oven comprises several oven modules disposed one after the other in the longitudinal direction, each of which comprising independently controllable heating devices and at least one supply duct for vapor and/or fresh air which leads to the hearths and at least one discharge duct for vapor and/or waste air which leads away from each hearth.

14 Claims, 9 Drawing Sheets

BAKING OVEN

BACKGROUND OF THE INVENTION

1. Field of the Invention

The invention relates to a baking oven, namely a so-called multistage baking oven.

2. Background Art

Multistage tunnel ovens are known, in which continuous hearths are formed in an elongated hearth body, a baking conveyor belt being disposed in each of the continuous hearths. These tunnel ovens can be designed for chargewise, i.e. stepwise, or for continuous operation. Charging and discharging these ovens can be automated in order that required production quantities can be realized effectively. By means of these ovens, different types of dough products with a need for individual baking processes depending on the recipe can be baked simultaneously on the various baking conveyor belts only to a very restricted extent. Further, these ovens cannot be utilized efficiently for small quantities of special kinds of bread. Finally, these ovens are comparatively rigid in terms of performance, i.e. capacity.

SUMMARY OF THE INVENTION

It is an object of the invention to embody a multistage baking oven which is flexible in size and ensures the baking of the most various dough products that need individual baking processes depending on the recipe.

According to the invention, this object is attained in a baking oven comprising several oven modules disposed one after the other in the longitudinal direction, each of which having several hearths disposed one above the other and possessing baking spaces which are disposed in alignment with each other in successive oven modules, an independently controllable heating device, at least one supply duct for vapor and/or fresh air which leads to the hearths, and at least one discharge duct for vapor and/or waste air which leads away from each hearth; baking conveyor belts running through baking spaces which are in alignment with each other; a head member disposed on a charging side and having deflection pulleys for the baking conveyor belts; a tail member disposed at a distance from the head member and having deflection pulleys for the baking conveyor belts; and at least one driving motor for the baking conveyor belts. The gist of the invention resides in the modular structure of the oven which permits any number of later extensions. If the capacity is to be increased, one or two further oven modules are added; only the baking conveyor belt must be prolonged as the case may be. Due to the fact that each module possesses an individually adjustable heating device, various baking processes can be carried out with high accuracy, the baking process varying for each dough product.

The improvement according to which the baking spaces of each oven module—related to the longitudinal direction—are closable at least at one end serves to intensify the separation of the individual baking zones in the individual oven modules.

The baking conveyor belts are guided in such a way that each baking space is heatable by means of an upper-heat heating device which is disposed above the upper strand of the respective baking conveyor belt and by means of a bottom-heat heating device which is disposed underneath the upper strand and above the lower strand of the respective baking conveyor belt.

The modular design according to the invention is possible for any type of heating, i.e. electric heating, thermo-oil heating, and combustion gas heating; it ensures in particular the use of combustion gas heating by distinctly separated combustion gas circuits in each oven module, which is particularly cost effective. Due to the fact that in this case the flow through the heating elements is straight and crosswise to the longitudinal direction of the oven, very uniform heat transfer takes place via the respective heating surface in the oven so that no temperature gradients occur in the baking spaces.

Further features, advantages and details of the invention will become apparent from the ensuing description of two exemplary embodiments, taken in conjunction with the drawing.

DESCRIPTION OF THE PREFERRED EMBODIMENTS

Figure 1:
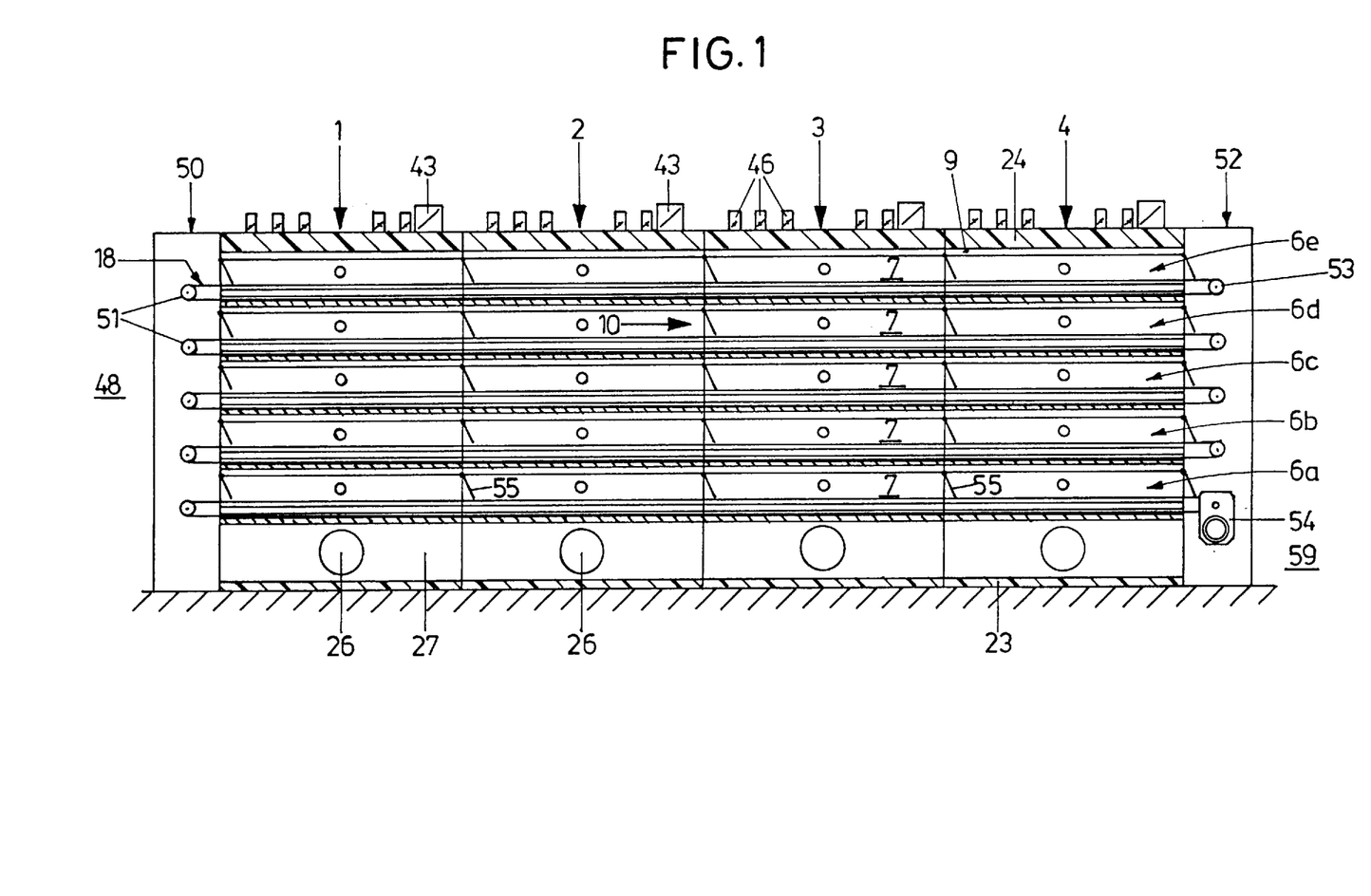
FIG. 1 is a vertical lengthwise section through a baking oven according to the invention in the form of a tunnel oven.

The baking oven seen in FIG. 1 is a so-called multistage tunnel oven which consists of several oven modules 1, 2, 3, 4 disposed one behind the other and joined to each other. Each module comprises a hearth body 5 in which several hearths—five in the embodiment according to FIGS. 1 to 4—6a, 6b, 6c, 6d, 6e are disposed in stages one above the other. Each hearth comprises a baking space 7 which is defined at its top side by an upper heating surface 8 formed by a thin sheet which substantially heats only by thermal radiation. This heating surface 8 constitutes part of upper-heat heating elements 9 which comprise heating gas ducts 11 extending horizontally and crosswise to the longitudinal direction 10 of the oven. On its lower side, each baking space 7 possesses bottom-heat heating elements 12 which are structured fundamentally in the same way as the heating elements 9 and which likewise comprise heating gas ducts 13 extending horizontally and crosswise to the longitudinal direction and are defined towards the baking space 7 by a heating surface 14. This heating surface 14 is also formed by a thin sheet.

Figure 2:
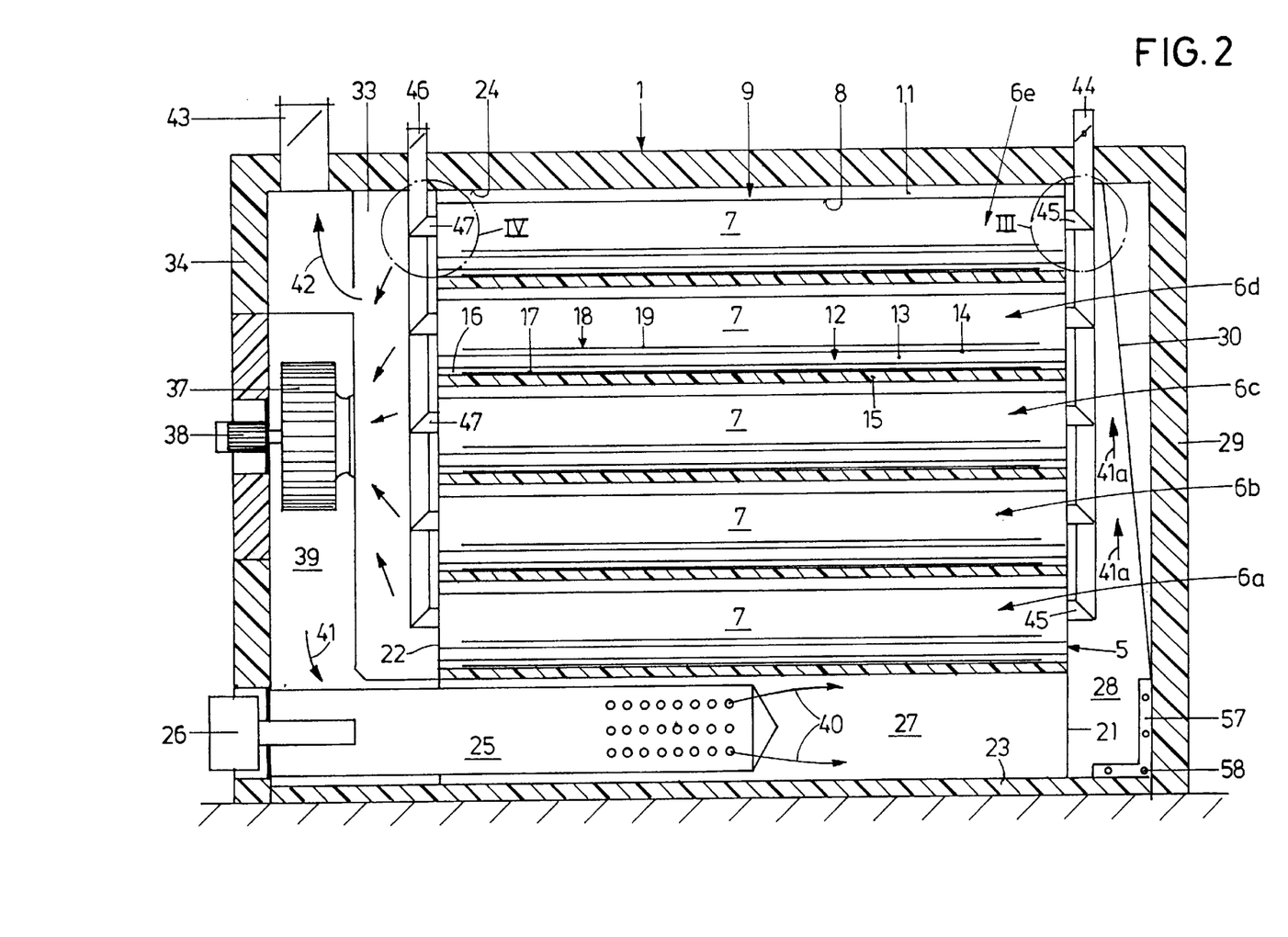
FIG. 2 is a cross-section through the first oven module of the baking oven.
Figure 3:
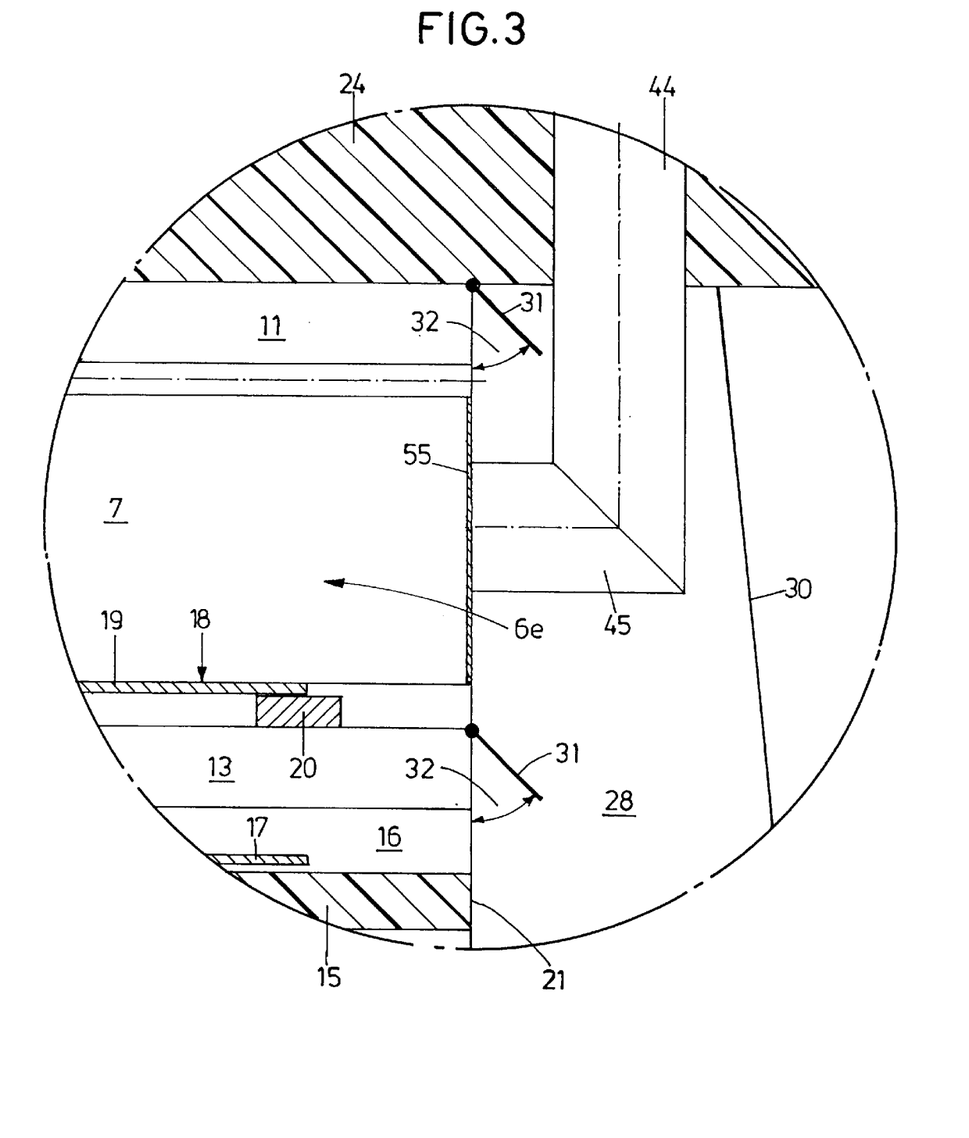
FIG. 3 is a detail, denoted by "III" in FIG. 2, on an enlarged scale.
Figure 4:
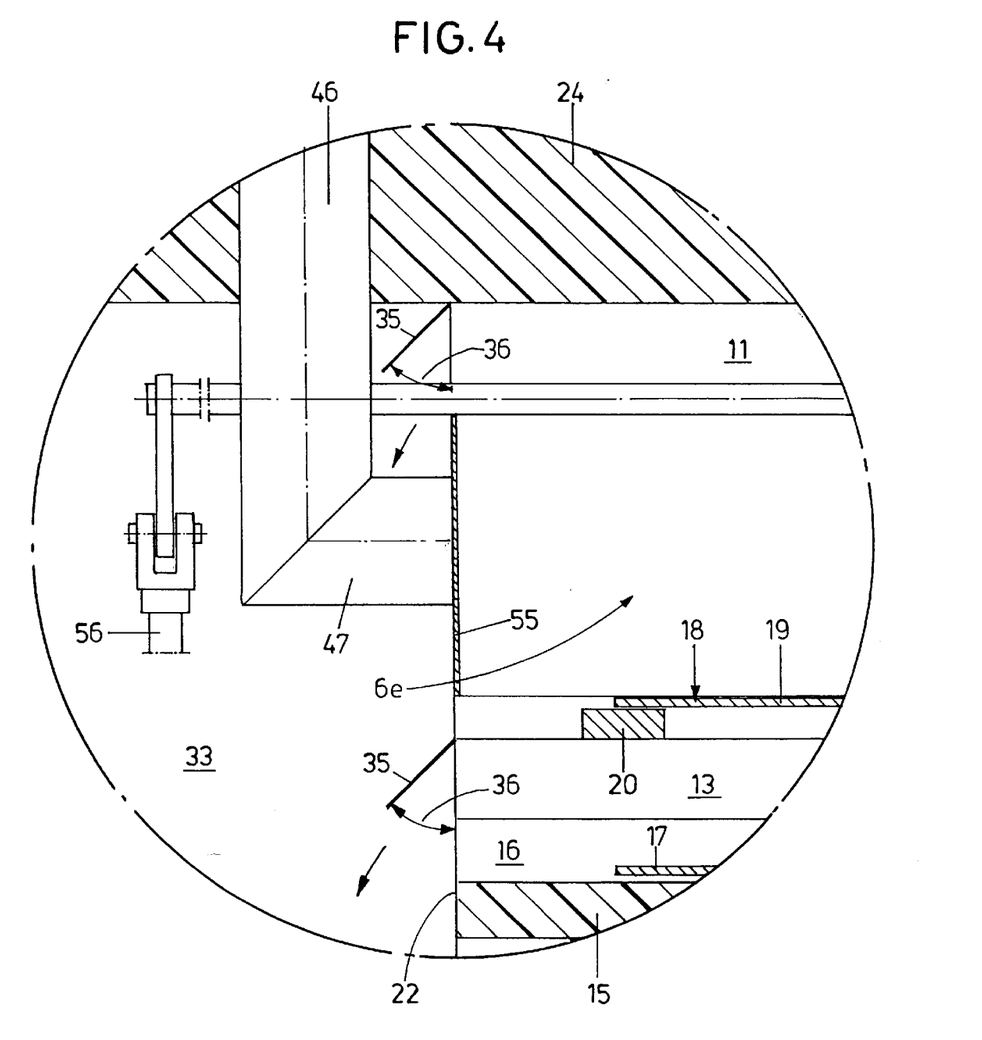
FIG. 4 is a detail, denoted by "IV" in FIG. 2, on an enlarged scale.

An intermediate insulator 15 is mounted underneath respective bottom-heat heating elements 12 and at a distance from these, i.e. above the upper-heat heating elements 9 of the next lower hearth 6b to 6e, for the individual hearths 6a to 6e to be thermally insulated from each other as far as possible. Between bottom-heat heating elements 12 and the intermediate insulator 15 located thereunder, provision is made for a return channel 16 for the lower strand 17 of a baking conveyor belt 18, the upper strand 19 of which is guided above the heating surface 14 of the bottom-heat heating elements 12 of a hearth 6a to 6e through the latter's baking space 7. Guidance takes place on guides 20 which are supported on the bottom-heat heating elements 12.

The hearths 6a to 6e are defined by a vertical side wall 21 and a side wall 22, both extending in the longitudinal direction 10 of the oven in the respective hearth body 5 and are supported and mounted on the bottom 23 and the top 24 of the hearth body 5 of a module 1 to 4.

Disposed underneath the lowest hearth 6a is a substantially cylindrical combustion chamber 25 into which opens a burner 26. The combustion chamber 25 is followed by a heating gas mixing chamber 27 which opens into the lower end of a heating gas supply channel 28 formed between one side wall 21 of the hearths 6a to 6e and the neighboring outer wall 29 of the hearth body 5. The heating gas supply channel 28 is defined by a limiting wall 30 in addition to the side wall 21, the limiting wall 30 being inclined upwards towards the side wall 21 so that the heating gas supply channel 28 has a cross-section that decreases upwards. The heating gas ducts 11 and 13 of the heating elements 9 and 12 are connected to the heating gas supply channel 28, regulating flaps 31 being provided in each case, by means of which the size of the inlet 32 of the heating elements 9 and 12, respectively, is modifiable.

The heating gas ducts 11 and 13 of all the hearths 6a to 6e discharge into a heating gas collecting chamber 33 which is disposed between the side wall 22 and an associated outer wall 34 of the hearth body 5. Alternatively or cumulatively to the regulating flaps 31 in the respective inlet 32 of the heating gas ducts 11 and 13, regulating flaps 35 of the same kind can be provided in the outlets 36 of the heating gas ducts 11 and 13 that open into the heating gas collecting chamber 33. The heating gas collecting chamber 33 discharges into a heating gas blower 37 which is driven by a motor 38. This blower 37 discharges into a heating gas return channel 39, downstream of which is disposed the combustion chamber 25. The top 24, the bottom 23 and the outer walls 29, 34 of the hearth body are thermally insulated.

Corresponding to the arrows of flow direction 40, the hot flue gases produced by the combustion process in the burner 26 flow from the combustion chamber 25 into the heating gas mixing chamber 27. This is where they are mixed with cooled heating gases which are supplied corresponding to the arrows of flow direction 41, whereby heating gas of a corresponding mixed temperature is produced. This heating gas is supplied to the heating elements 9 and 12 through the heating gas supply channel 28 and the inlets 32 corresponding to the arrows of flow direction 41a. Due to the suction of the blower 37, it is sucked through the heating elements 9 and 12, leaving them through the outlets 36. It streams through the heating gas collecting chamber 33 and is then forced by the blower 37 into the heating gas return channel 39, form where—as explained above—it arrives in the combustion chamber 25. To the extent fresh heating gas is supplied by the burner 26 to the mixing chamber 27, cooled heating gases are discharged through the chimney 43 corresponding to the arrow of flow direction 42. The heating gases flow through the heating elements 9 and 12 in a straight line at right angles to the longitudinal direction 10 of the oven. For the purpose of improved heat transfer, they may also be swirled or deflected by formed pieces disposed in the heating elements 9 and 12.

A vertical supply duct 44 is disposed in the oven modules 1 to 4, per hearth 6a to 6e, in the vicinity of the heating gas supply duct 28; it emerges upwards and, via a branch duct 45, passes through the side wall 21 into the baking space 7 of each hearth 6a to 6e. Through this supply duct 44, each hearth 6a to 6e can be provided with vapor, i.e. water steam, for the treatment with vapor of the dough products or with fresh air for the purpose of clearing from vapor. In the vicinity of the heating gas collecting chamber 33, discharge ducts 46 are disposed, which correspond to the supply ducts 44 and which likewise emerge upwards; by means of a branch duct 47 passing through the side wall 22, they are each connected with the baking space 7 of a hearth 6a to 6e.

In the oven module 1, i.e. in vicinity to the charging side 48, vapor, i.e. steam, which has been produced outside the oven, is supplied via the supply duct 44 into the baking spaces 7 and discharged through the discharge ducts 46. In the modules 2 to 4, fresh air is supplied through the supply ducts 44, whereas waste air is discharged through the discharge ducts 46 together with vapor which originates in the respective baking space 7.

Figure 5:
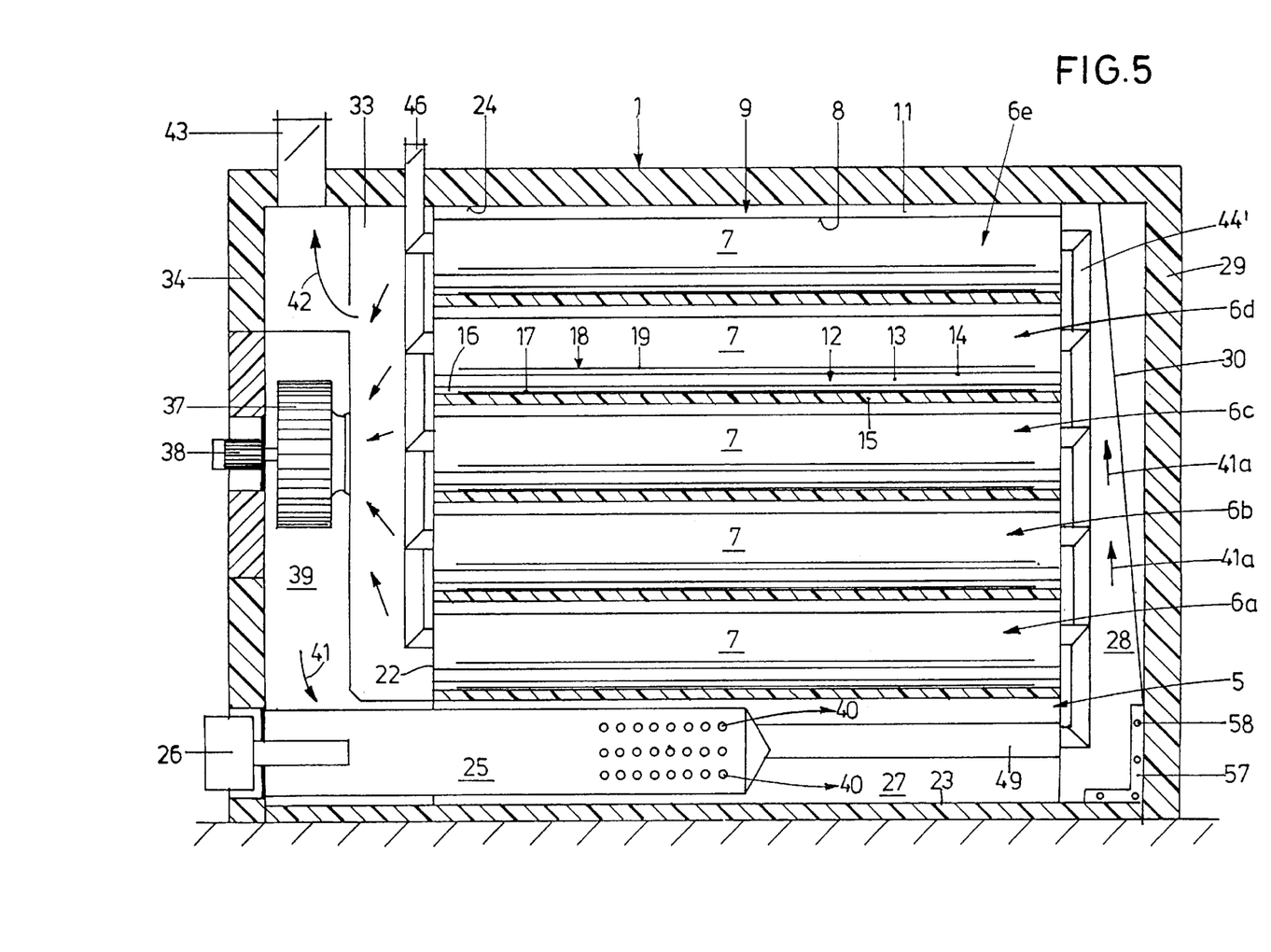
FIG. 5 is a cross-section through the oven in an illustration according to FIG. 2 with a modified embodiment of the vaporing system.

In the embodiment according to FIG. 5, internal vapor generation is provided for the first oven module 1. In this case, vapor generation pipes 49 are disposed on both sides of the combustion chamber 25, into which water is sprayed in known manner, which is evaporated by the heat from the burner 26. These pipes 49 are connected to the supply ducts 44', which in this case do not emerge outwards from the hearth body 5.

A head member 50, in which deflection pulleys 51 for the continuous baking conveyor belts 18 are lodged, is disposed upstream of the first oven module 1 on the charging side 48. A tail member 52 is disposed downstream of the last oven module 4, in which also deflection pulleys 53 for the baking conveyor belts 18 are lodged. The deflection pulleys 51 and 53 are drivable by means of drive motors 54 which are only roughly outlined. The longitudinal direction 10 of the oven corresponds to the conveying direction of the baking conveyor belt 18. Each baking conveyor belt 18 runs through the baking spaces 7, disposed in alignment one after the other, of the hearths 6a, 6b, 6c, 6d, 6e which, in this regard, are allocated to one another. For it to be possible to adjust varying baking conditions in the individual baking chambers 7 of each module 1 and 2 and 3 and 4, respectively, the baking spaces of each module 1 to 4 can be closed by a flap 55.

Since there must be one more flap 55 than there are oven modules 1 to 4, provision must correspondingly be made for another set of flaps 55 either on the head member 50 or on the tail member 52. These flaps 55 are actuated by servomotors 56 which are only roughly outlined. When closed, they prevent that a draft as in a chimney passes through the baking spaces 7.

The entirely independent modules 1 to 4 are joined to each other by means of screws 58 screwed on flanges 57 which are only roughly outlined in the drawing. The head member 50 is joined to the first module 4 in the same way and the tail member 52 is correspondingly joined to the last module 4. The head member 50 may also be integrated in the first module 1. The same applies to the integration of the tail member 52 into the last module 4. Depending on the desired capacity of the oven, as much as fifteen modules 1 to 4 can be disposed one after the other. Only the length of the baking conveyor belts 18 has to be adapted.

Charging with dough products on the charging side 48 through the head member 50 and discharging on the discharging side 59 through the tail member 52 take place as it is customary and known for multistage tunnel ovens. Constant baking conditions, in particular constant temperatures, can be adjusted in each hearth 6a to 6e of each module 1 to 4, it being possible that the temperature varies among the hearths 6a to 6e of one module 1 to 4 when varying dough products are baked on the individual baking conveyor belts 18. Charging takes place in such a way that dough products are placed on a baking conveyor belt by way of the head member 50 until the corresponding baking space 7 of the first module 1 is filled. After the flaps 55 have been closed, the respective baking space 7 in the module 1 is treated with vapor for a given time and the dough products are baked for a given time at a given constant temperature. Then all the flaps 55 allocated to a baking conveyor belt 18 are opened and the belt 18 is driven so that the mentioned dough products are conveyed from the baking space 7 of the first module 1 into the downstream baking space 7 of the module 2. Simultaneously fresh dough products are charged for the baking space 7 of the first module. Then the flaps 55 are closed again and the dough products now located in the baking space of the second module 2 is baked at a different temperature, as a rule at a lower temperature, fresh air being supplied through the supply duct 44 for the purpose of clearing from vapor. These operating steps continue until the dough products mentioned at the outset have been finished in the last module 4 and are subsequently discharged through the tail member 52 on the discharging side 59. Synchronizing the charging and discharging of the baking conveyor belts 18 which are disposed one above the other is effected in accordance with the baking program of the entire oven.

By closing the regulating flaps 31 and/or 35, individual hearths 6a to 6e in all the modules 1 to 4 can be put out of operation so that baking takes place on the corresponding baking conveyor belt 18 only by stored energy. Also any supply of heat to the latter is precluded in this way.

Figure 6:
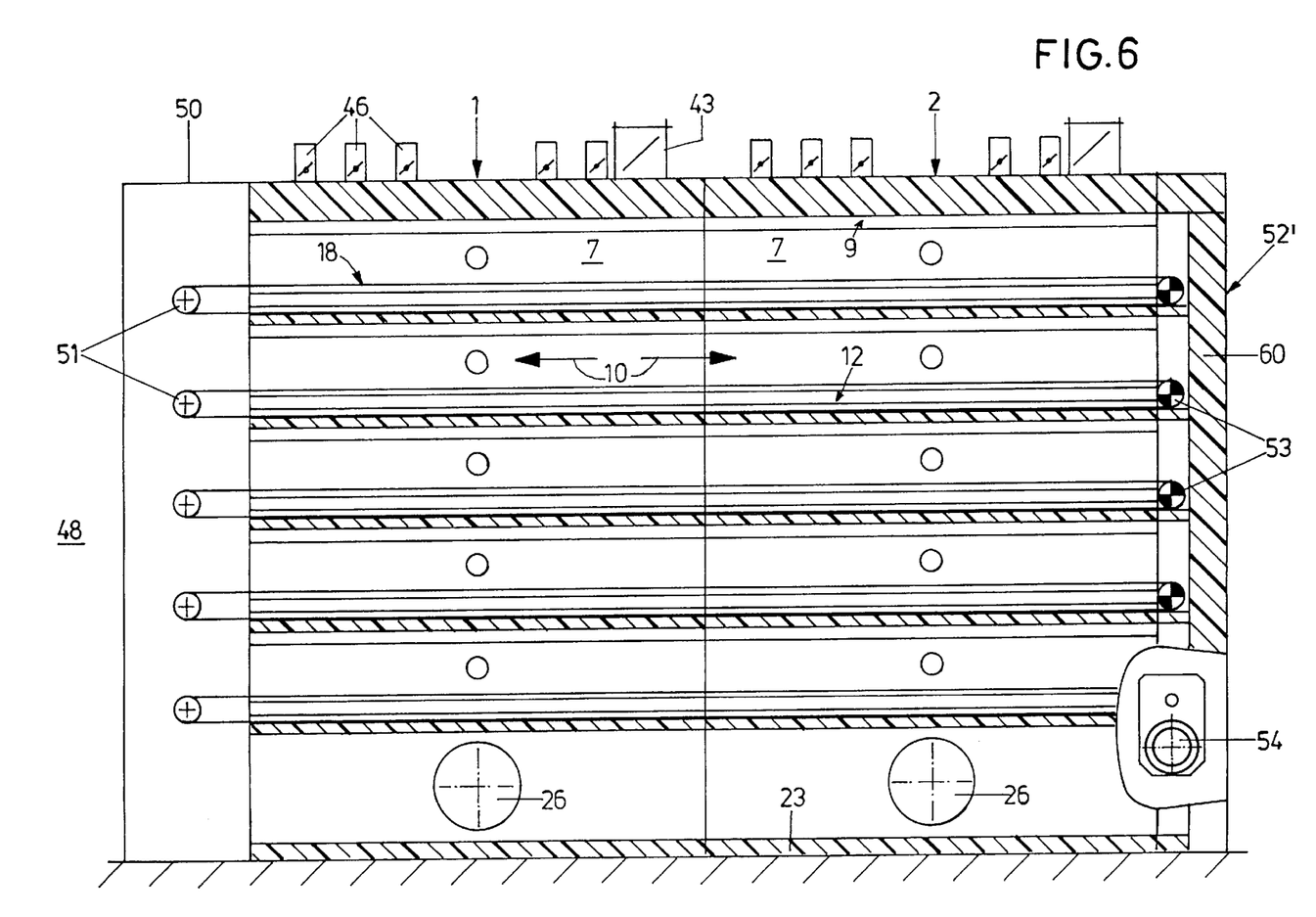
FIG. 6 is a vertical lengthwise section of a baking oven according to the invention in the form of a reversing oven.

FIG. 6 illustrates how reversing operation is possible, based on the modular design according to the invention, charging and discharging in this case taking place at the head member 50. In this case a closed tail member 52' is provided, which is closed by an insulated rear wall 60. For illustration of this, the arrow 10 indicating the conveying direction of the baking belt 18 is directed in both senses. Correspondingly, the respective drive motor 54 must be reversibly drivable.

Figure 7:
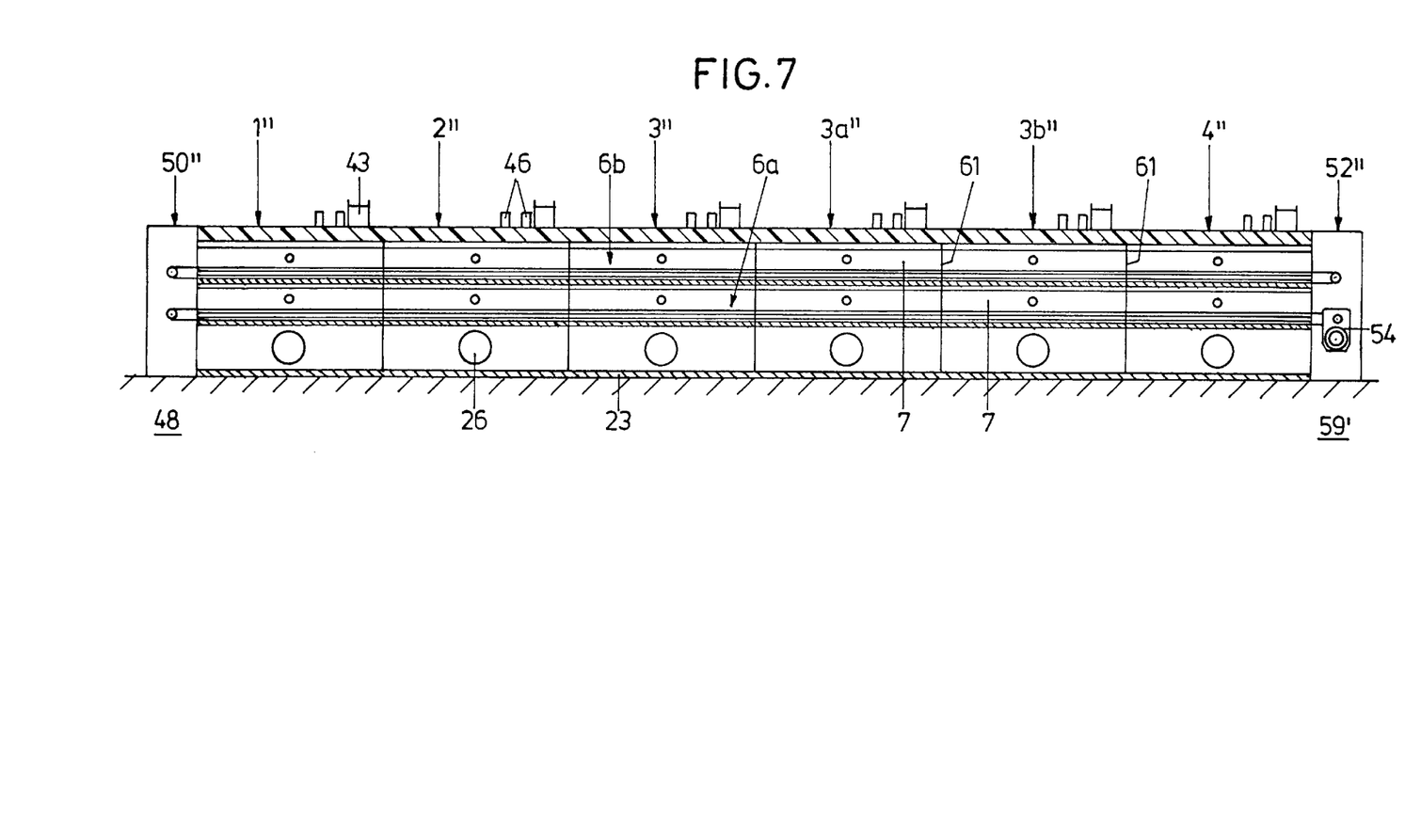
FIG. 7 is a vertical lengthwise section through a baking oven according to the invention in the form of a continuously operated tunnel oven.

According to FIG. 7, the oven can also be operated as a continuously working multistage tunnel oven. In this case, the number of modules 1", 2", 3", 3a", 3b", 4" will be higher than in the exemplary embodiment illustrated. Further, it can be suitable that no flaps are provided since they would interfere with the continuous passage of the dough products. The flaps are then mostly replaced by heat resisting curtains 61. In FIG. 7, same as in FIG. 6, the identical components have the same reference numerals as in the exemplary embodiment described at the outset, comparable components which are not identical constructionally having the same reference numeral provided with a double prime.

Figure 8:
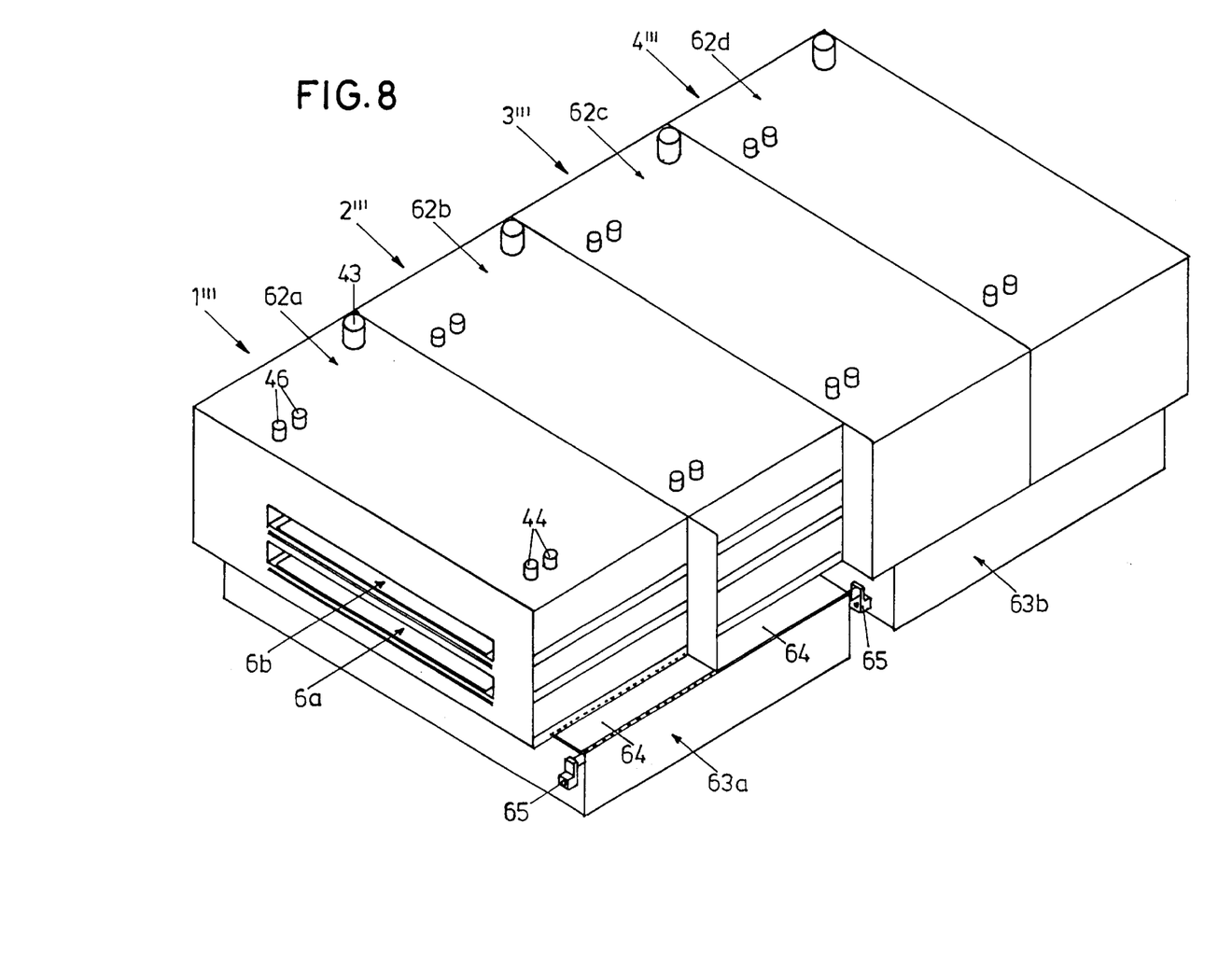
FIG. 8 is a perspective view of a baking oven in accordance with another embodiment.
Figure 9:
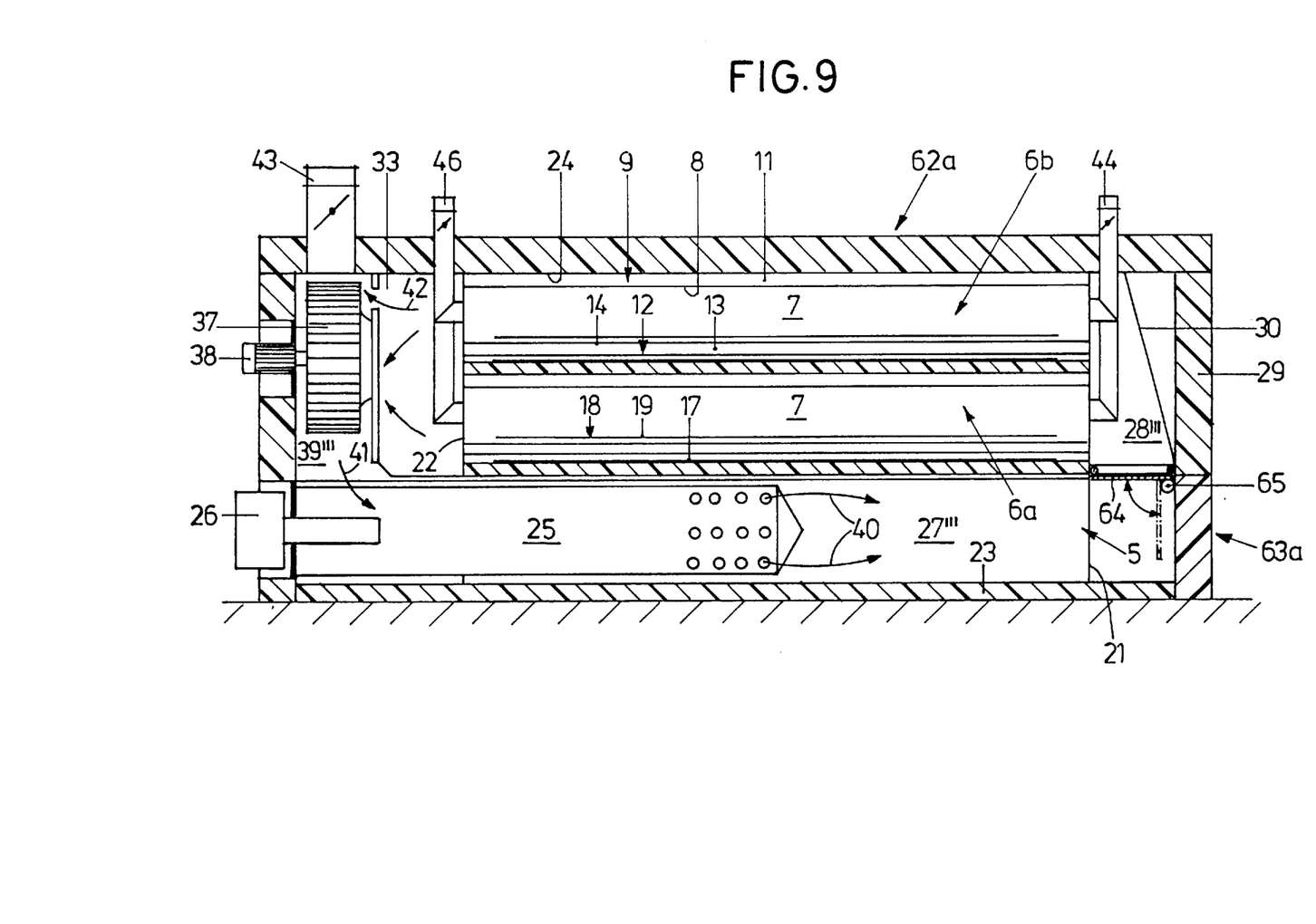
FIG. 9 is a cross-section through the first oven module of the baking oven according to FIG. 8.

FIGS. 8 and 9 illustrate another embodiment of a baking oven. In the following only the deviations from the exemplary embodiment described at the outset are explained, identical components having the same reference numerals and components of functionally identical operation being denoted by the reference numeral of the comparable component of the embodiment mentioned at the outset provided with a triple prime. The baking oven seen in FIG. 8 consists of several hearth modules 62a, 62b, 62c, 62d which are disposed one after the other and connected with each other. A head member and a tail member and the necessary baking conveyor belts are not illustrated. Two hearth modules 62a, 62b and 62c, 62d at a time are disposed on a burner module 63a and 63b, respectively. There is also the possibility to arrange three or still more of the hearth modules 62a, 62b, 62c, 62d on a burner module 63a and 63b, respectively. They are structured in the same way as such part of each oven module 1, 2, 3, 4 that is located above the burner 26 in FIG. 1. As with the embodiment shown in FIG. 1, the burner module 63a and 63b comprises a burner 26 with a combustion chamber 25, downstream of which a heating gas mixing chamber 27''' is disposed, extending in width substantially over two of the hearth modules 62a, 62b and 62c, 62d, one burner 26 in each case being disposed centrally under them. Heating gas flaps 64 are provided at the lower end of the heating gas supply channels 28''' of the hearth modules 62a, 62b and 62c, 62d in each burner module 63a, 63b. The heating gas flaps 64 are continuously pivotal by an actuating drive 65, which may be an electric motor, between a first stop position in which the associated heating gas supply channel 28''' is closed, and a second position in which the heating gas supply channel 28''' is entirely opened so that a portion, to be pre-determined by the position of the heating gas flaps 64, of the flow of heating gas heated by the burner 26 arrives in the respective hearth module 62a or 62b and 62c or 62d. By relative adjustment of the heating gas flaps 64 of the hearth modules 62a, 62b that belong to the burner module 63a and of the hearth modules 62c, 62d that belong to the burner module 63b, splitting of the heating gas flow can be reached in dependence on the temperatures desired in the respective hearth modules 62a, 62b, 62c, 62d. After having streamed through the respective baking spaces 7, the heating gas is supplied in the heating gas return channels 39''' to the respective burner 26.

By contrast to FIGS. 1 and 2, only two hearths 6a, 6b are illustrated in FIGS. 8 and 9. It goes without saying that further hearths can be provided.

What is claimed is:

1. A baking oven with a longitudinal direction (10), a charging side (48), and comprising
    several oven modules (1 to 4) disposed one after the other in the longitudinal direction (10), each of which having several hearths (6a to 6e) disposed one above the other and comprising baking spaces (7) which are disposed in alignment with each other in successive oven modules (1 to 4),
    an independently controllable heating device,
    at least one supply duct (44, 44") for at least one of vapor and fresh air which leads to the hearths (6a to 6e), and
    at least one discharge duct (46) for the at least one of vapor and waste air which leads away from each hearth (6a to 6e);
    baking conveyor belts (18) having an upper strand (19) and a lower strand (17) and running through baking spaces (7) which are in alignment with each other;
    a head member (50) disposed on a charging side (48) and having deflection pulleys (51) for the baking conveyor belts (18);
    a tail member (52, 52') disposed at a distance from the head member (50) and having deflection pulleys (53) for the baking conveyor belts (18); and
    at least one driving motor (54) for the baking conveyor belts (18).

2. A baking oven according to claim 1, wherein the baking spaces (7) of each oven module (1 to 4) related to the longitudinal direction (10) are closable at least at one end.

3. A baking oven according to claim 1, wherein each baking space (7) is heatable by means of an upper-heat heating device which is disposed above the upper strand (19) of the respective baking conveyor belt (18).

4. A baking oven according to claim 1, wherein each baking space (7) is heatable by means of a bottom-heat heating device which is disposed underneath the upper strand (19) and above the lower strand (17) of the respective baking conveyor belt (18).

5. A baking oven according to claim 1, wherein each oven module (1 to 4) comprises a heating-gas heating device with a burner (26), and wherein the heating devices are formed as heating elements (9, 12) for the heating gases to flow through the heating devices horizontally, at right angles to the longitudinal direction (10).

6. A baking oven according to claim 5, wherein at least one heating gas supply channel (28), which is connected with the burner (26) and with the heating elements (9, 12), is provided in vicinity to a lateral outer wall (29), and at least one heating gas collecting chamber (33), which is connected with the heating elements (9, 12) and with the burner (26), is provided in vicinity to an opposite lateral outer wall (34).

7. A baking oven according to claim 5, wherein at least one of inlets (32) and outlets (36) of the heating elements (9, 12) are provided with regulating flaps (31, 35).

8. A baking oven according to claim 7, wherein a heating gas blower (37) is allocated to the heating gas collecting chamber (33).

9. A baking oven according to claim 5, wherein the heating elements (9, 12) are formed for the heating gases to flow through the heating elements (9, 12) in a straight line.

10. A baking oven according to claim 2, wherein the baking spaces (7) of each oven module (1 to 4) are closable by at least one flap (55).

11. A baking oven according to claim 2, wherein the baking spaces (7) of each oven module (1", 2", 3",. 3a", 3b", 4") are closable by at least one heat resisting curtain (60).

12. A baking oven according to claim 1, wherein the heating devices of at least two oven modules (1''', 2''', 3''', 4''') are connected with a joint burner module (63a, 63b).

13. A baking oven according to claim 12, wherein the burner module (63a, 63b) comprises a number of heating gas flaps (64) which corresponds to the number of the combined oven modules (1''', 2''', 3''', 4'''), the heating gas flaps (64) being pivotal between a first position in which the supply of heating gas to the respective oven module (1''', 2''', 3''', 4''') is blocked, and a second position in which the supply of heating gas to the respective oven module (1''', 2''', 3''', 4''') is completely freed, and intermediate positions.

14. A baking oven according to claim 13, wherein the heating gas flaps (64) are adjustable by actuating drives (65).

* * * * *